Fig. 1.

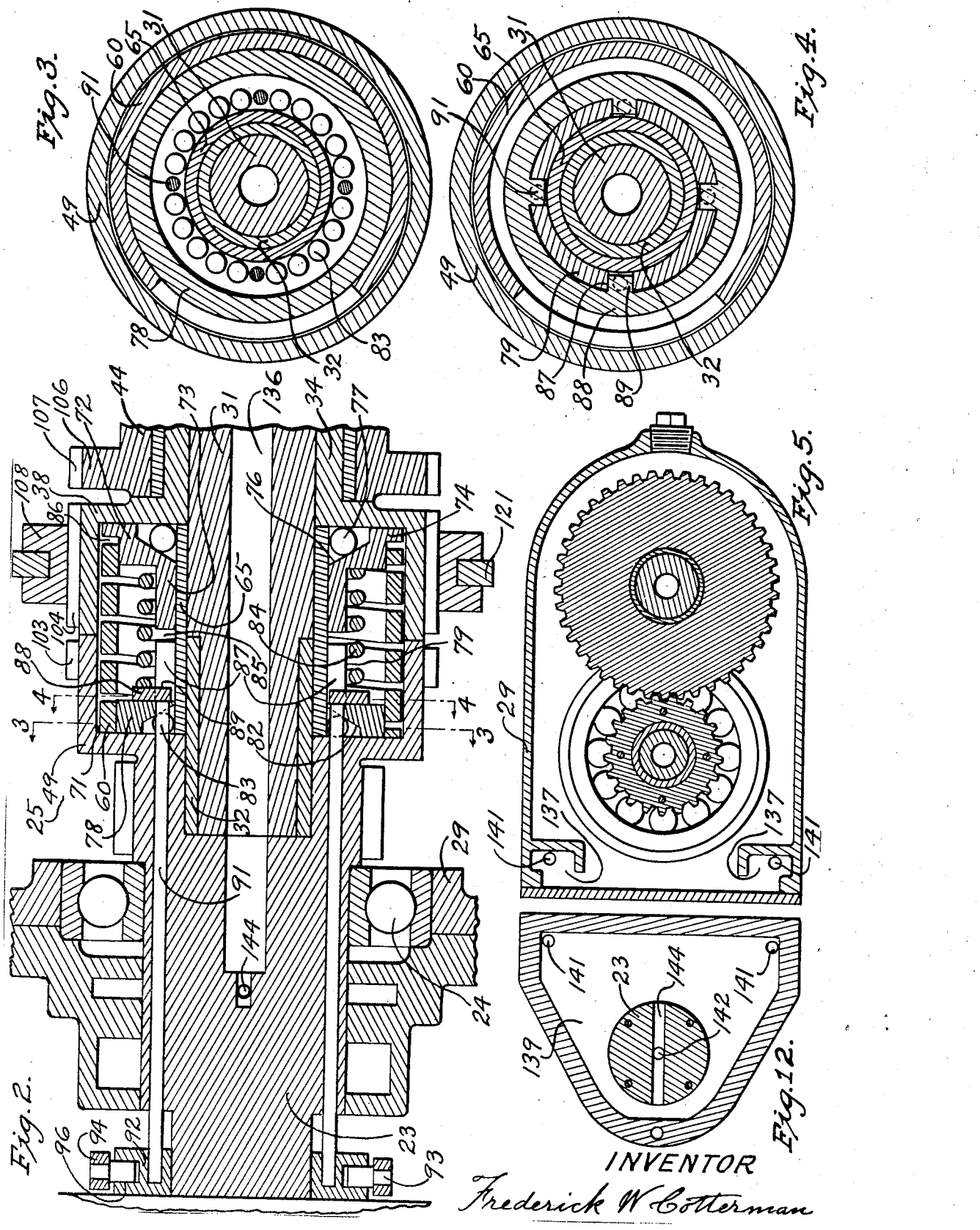

March 6, 1934. F. W. COTTERMAN 1,950,163
ACCELERATOR CONTROLLED AUTOMOTIVE TRANSMISSION
Filed March 17, 1933 3 Sheets-Sheet 3
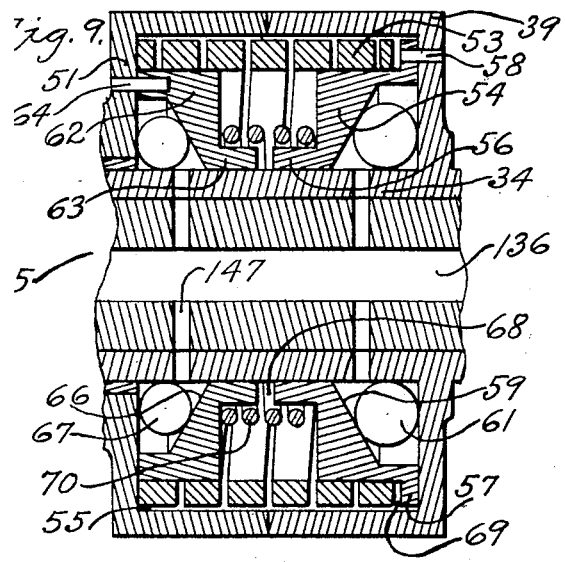
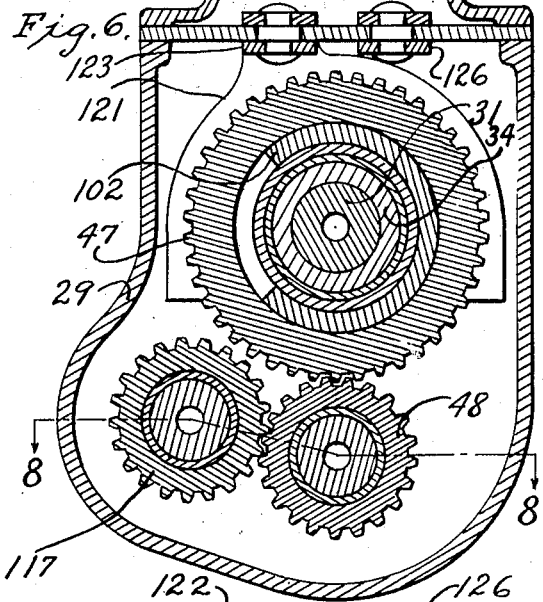
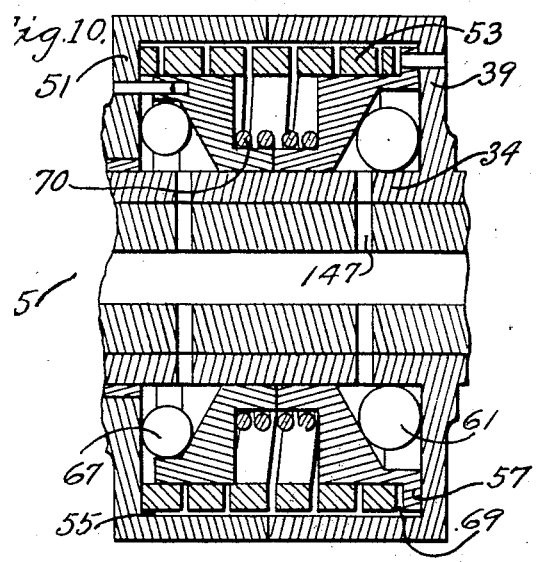
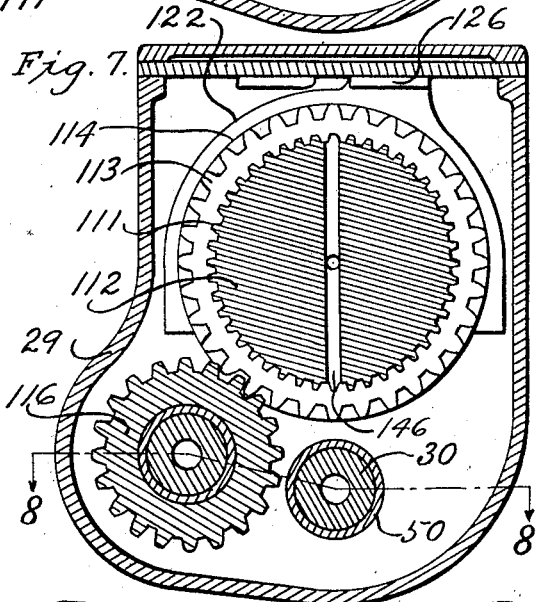
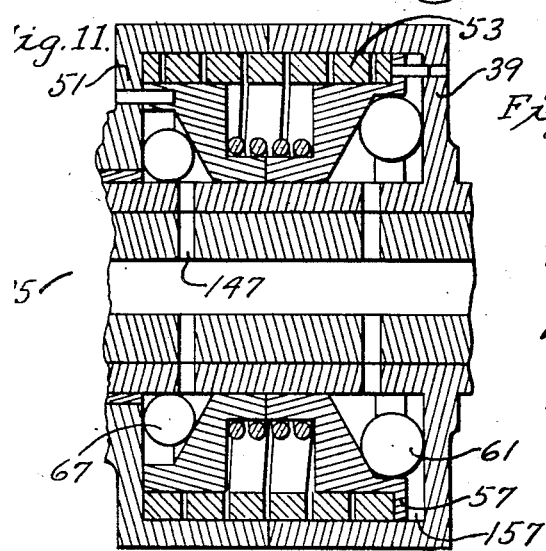
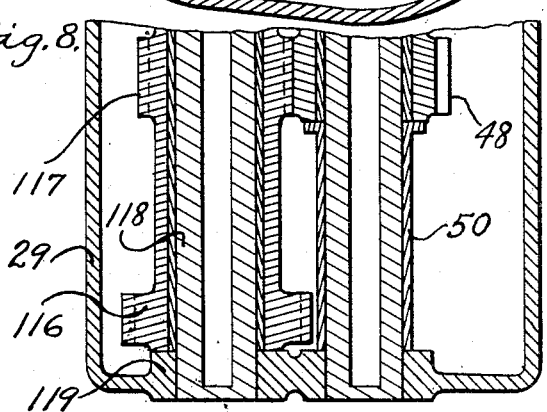
INVENTOR
Frederick W. Cotterman Patented Mar. 6, 1934

1,950,163

UNITED STATES PATENT OFFICE 1,950,163

ACCELERATOR CONTROLLED AUTOMOTIVE TRANSMISSION

Frederick W. Cotterman, Dayton, Ohio, assignor of one-half to Estate of Vincent G. Apple, deceased, Dayton, Ohio; Herbert F. Apple, Edward M. Apple, and Gourley Darroch, executors Application March 17, 1933, Serial No. 661,324

20 Claims. (Cl. 74—59)

REISSUED

This invention relates to transmission mechanism for automotive use and is particularly applicable to motor vehicles.

An object of the invention is to provide transmission mechanism having both "free wheeling" and "conventional" characteristics and so arranged that when the conventional "H" control lever is operated to any of its several speed-changing positions, free wheeling is automatically eliminated, but when the "H" control lever is placed in neutral position and left there, both free wheeling and accelerator controlled gear shifting is thereby provided, to the end that the transmission may be shifted through its entire range of forward speed changes by mere manipulation of the accelerator pedal.

Another object is to provide mechanism whereby a steady depression of the accelerator pedal will maintain the transmission mechanism always in the gear ratio in which it then is, but sudden release of the accelerator pedal, at or after certain predetermined vehicle speeds have been attained, will shift the transmission mechanism to the next higher gear ratio.

Another object is to provide mechanism whereby full depression of the accelerator pedal, when the vehicle is in high gear and is moving at less miles per hour than its maximum second speed, will shift the transmission mechanism back from high gear to second gear, to the end that if the operator finds that he has shifted from second to high gear at too low a vehicle speed, he need only depress the accelerator pedal fully and the transmission mechanism will return to second speed.

That these and other objects are attained will be apparent from a consideration of the following description, reference being had to the accompanying drawings wherein, Fig. 1 is a vertical axial section through the transmission mechanism.

Fig. 2 is a fragmentary horizontal axial section taken at 2—2 of Fig. 1 showing the mechanism for returning the gear ratio from high back to second.

Figs. 3 and 4 are transverse sections taken through Fig. 2 at 3—3 and 4—4 respectively.

Figs. 5, 6 and 7 are transverse sections taken through Fig. 1 at 5—5, 6—6 and 7—7 respectively.

Fig. 8 is a horizontal section taken through Figs. 1, 6 and 7 on the line 8—8.

Fig. 9 is fragmentary portion of Fig. 1 drawn to a larger scale showing the relation of the parts of the second speed clutch when the vehicle is at rest.

Fig. 10 shows the same parts as Fig. 9 and the relation they maintain as long as the accelerator pedal is steadily depressed.

Fig. 11 shows the same parts as Fig. 9 and the relation they assume when the accelerator pedal is suddenly released and the engine allowed the drop to a reduced speed.

Fig. 12 is a transverse section taken at 12—12 of Fig. 1.

Similar numerals refer to similar parts throughout the several views.

Within the flywheel housing 26 of a conventional automotive engine is the usual flywheel 27 which contains the clutch 28 for connecting the engine to the transmission.

The clutch may be a foot operated clutch but is preferably either a centrifugal or a vacuum operated clutch constructed and arranged in such a manner that the depression of the accelerator pedal but slightly, will operate the clutch into engagement and connect the engine to the transmission.

Whatever type of clutch may be used the driven clutch member is secured to the pinion shaft 23 which is supported in ball bearing 24 in the transmission housing 29.

Within the transmission housing 29 the main shaft 31 at one end has a bearing 32 in the end of the drive pinion shaft, and is supported at the other end in the bearing 33. The countershaft 30 is held against rotation in the hubs 40, which are located one at each end of the housing. A high speed spring clutch broadly designated by the numeral 25, a second speed spring clutch broadly designated by the numeral 35, and a low speed spring clutch broadly designated by the numeral 45 surround the main shaft 31 between spaced apart pairs of gears. Immediately surrounding the main shaft 31 is the spring clutch sleeve 34. Solely to facilitate assembly, the spring clutch sleeve 34 is divided into three lengths which are end splined together at 36 and 37, but for clearness of description the spring clutch sleeve 34 will be referred to as a single part.

Spring clutch sleeve 34 has spaced apart along its length, the high speed spring clutch cup 38, the second speed spring clutch cup 39 and the low speed spring clutch cup 41. These three cups always rotate in unison and are always the driven members of the spring clutches.

The main drive pinion 42 is integral with the shaft 23 and is in constant mesh with a gear 43 on the countershaft 30. Second speed gear 44 surrounds and has free bearing on the spring clutch sleeve 34 and is in constant mesh with the countershaft gear 46. Low speed gear 47 surrounds, and has free bearing on the spring clutch sleeve 34 and is in constant mesh with a gear 48 on the countershaft 30. The three countershaft gears 43, 46 and 48 are integral. A spacing sleeve 50 takes up the unused part of the countershaft 30. The pinion 42 has a spring clutch cup 49 integral. The gear 44 likewise has a spring clutch cup 51 integral. Gear 47 is itself hollowed out to serve as a spring clutch cup at 52. The three spring clutch cups 49, 51 and 52 always rotate at different speeds and are always the driving members of the spring clutches.

The operative mechanism of the second speed clutch 35 contained within the second speed driving clutch cup 51 and the second speed driven clutch cup 39 comprises the second speed clutch spring 53. (See enlarged view of second speed clutch Fig. 9.) Spring 53 is preferably made of rectangular bar stock the cross section of which has greater breadth than height. Spring 53 is accurately machined and has an outside diameter preferably about one two hundredth of an inch less than the inside diameter of the cups 51 and 39, leaving the space 55 between the spring and the cups.

A ring 54 has a hub 56 slidable axially over the clutch sleeve 34. An outwardly extending flange 57 is provided to engage and compress the spring 53 when the ring 54 is moved axially. A pin 58, fitted loosely in the wall of cup 39 and tightly in the flange 57, keeps the ring 54 turning in unison with the cup 39. The inside face of the ring 54 is beveled as at 59. A series of ground steel balls 61 are held between the beveled face 59, the sleeve 34, and the inner face of the cup 39.

A second ring 62 has a hub 63 slidable axially over the clutch sleeve 34. A pin 64 keeps the ring 62 rotating in unison with the cup 51. Pin 64 fits tightly in the cup 51 and loosely in a hole in the face of the ring 62. The inside face of the ring 62 is beveled as at 66. A series of ground steel balls 67 are held between the beveled face 66, the sleeve 34, and the inner face of the cup 51.

The two rings 54 and 62 are urged axially in opposite directions against the balls 61 and 67 by the spring 70, normally leaving the space 68 between the ends of the hubs 56 and 63. The length of spring 53 is such that a slight space 69 is normally left between the end of the spring 53 and the flange 57. The inner diameter of spring 53 is such as to fit over the rings 54 and 62 loosely.

The operative mechanism of the high speed spring clutch 25, contained within the high speed driving clutch cup 49 and the high speed driven clutch cup 38 comprises a clutch spring 60 and in other respects is somewhat similar to the second speed clutch just described. The high speed clutch 25 however, has additional mechanism operable by connection to the accelerator pedal for returning the transmission to second gear if it has been shifted to high gear at less than its possible maximum speed in second. This additional mechanism is best shown in the enlarged views Figs. 2, 3 and 4.

Referring to Fig. 2 it will be seen that the spring 60 fits the driving cup 49 and the driven cup 38 loosely, leaving the space 71 between the outside diameter of the spring 60 and the inside diameter of the cups 49 and 38.

Figure 1:
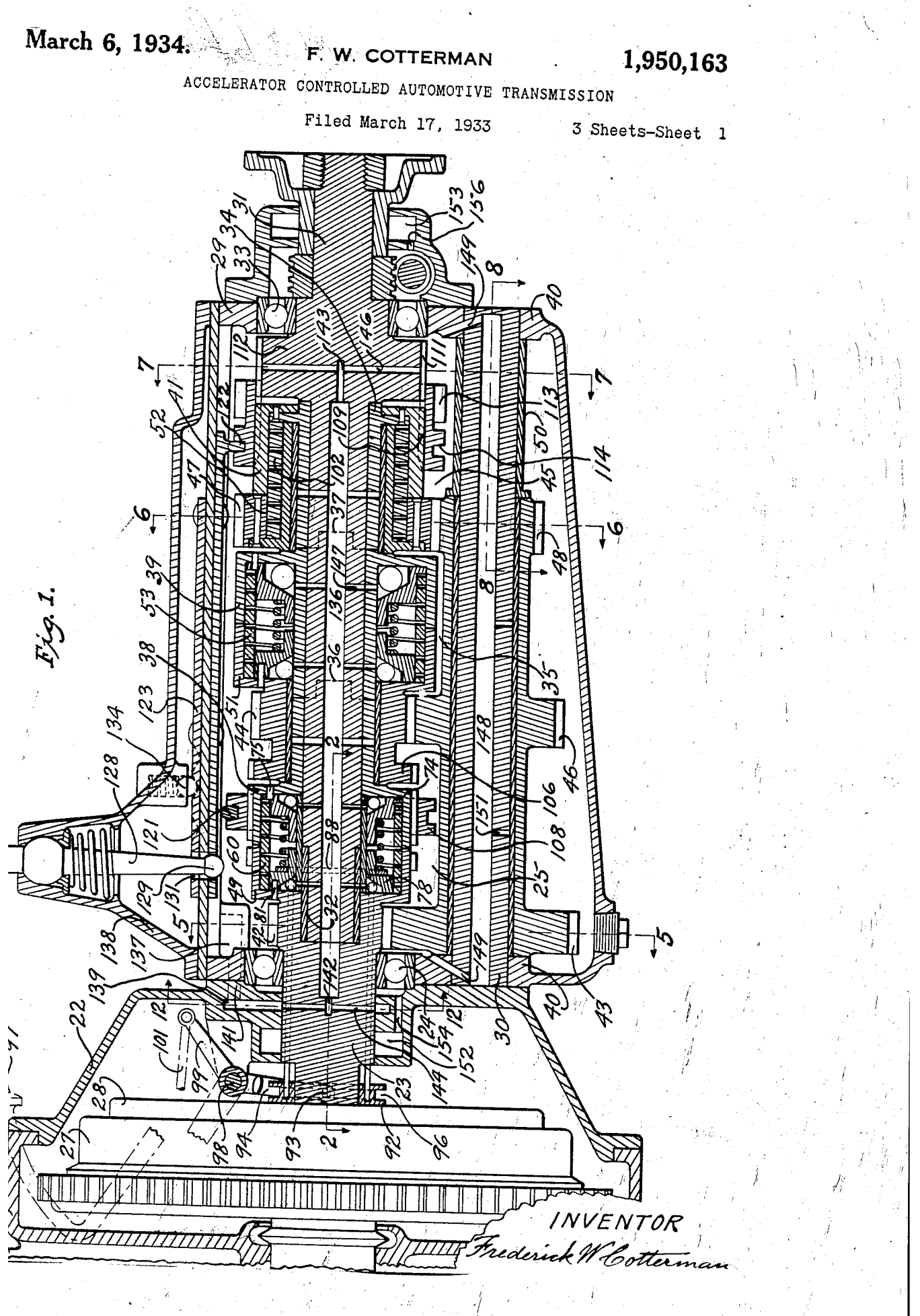

A ring 72 has a hub 73 slidable axially over a spacing tube 65 which surrounds the main shaft 31. An outwardly extending flange 74 is provided to engage and compress the spring 60 when the ring 72 is moved axially. A pin 75 (see Fig. 1) fitted loosely in the wall of cup 38 and tightly in the flange 74, keeps the ring 72 turning in unison with the cup 38. The inside face of the ring 72 is beveled as at 76. A series of ground steel balls 77 are held between the beveled face 76, the tube 65 and the inner face of the cup 38.

A second ring 78 has a hub 79 slidable axially over the spacing tube 65. A pin 81 (see Fig. 1) keeps the ring 78 rotating in unison with the cup 49. Pin 81 fits tightly in the cup 49 and loosely in a hole in the face of the ring 78. The inside face of the ring 78 is beveled as at 82. A series of ground steel balls 83 are held between the beveled face 82, the tube 65, and the inner face of the cup 49.

The two rings 72 and 78 are urged axially in opposite directions against the balls 77 and 83 by the spring 84, normally leaving the space 85 between the ends of the hubs 73 and 79. The length of the spring 60 is such that a slight space 86 is normally left between the end of the spring 60 and the flange 74. The inner diameter of spring 60 is such as to fit over the rings 72 and 78 loosely.

The hub 79 of the ring 78 is slotted through at four equally spaced places 87 (see Fig. 4). A washer 88 surrounds the hub 79. The washer 88 has four ears 89 extending inwardly into the slots 87. The washer 88 is slidable axially over the hub 79 but is urged against the ring 78 by the spring 84. Four rods 91 extend lengthwise through the shaft 23, the outer ends of the rods being tightly held in the collar 92 and the inner ends abutting the ears 89 of the washer 88.

The collar 92 is axially slidable on the shaft 23. Studs 93 tightly held in a bifurcated lever 94 extend into a groove 96 in the periphery of the collar. The lever 94 is an extension of the accelerator pedal 97 which is fulcrumed at 98. A second extension 99 of the accelerator pedal carries the rod 101 which extends forwardly for connection to the engine carburetor. Depression of the accelerator pedal 97 at once moves the rod 101 to increase the engine fuel and moves the collar 92 to compress the spring 84 through the rods 91 and washer 88. The reason for so compressing the spring 84 will hereinafter appear.

The low speed spring clutch 45 contains nothing within the driving cup 52 and the driven cup 41 except the spring 102, which is accurately machined and normally has an outside diameter several thousands of an inch larger than the inside diameter of the cups 52 and 41 which contain it. Clutch 45 always becomes operative upon mere reversal of direction, like any overrunning clutch, and has no other operative mechanism.

The outside surfaces of high speed driving clutch cup 49 and high speed driven clutch cup 38 have fine clutch teeth 103 and 104 cut upon them respectively (see Fig. 2). A flange 106 integral with gear 44 has corresponding clutch teeth 107. A grooved collar 108 normally on the teeth 104 has corresponding internal clutch teeth, and is slidable axially to three positions so that, at the extreme forward end of its movement it connects cup 49 to cup 38 whereby they rotate in unison no matter which becomes the driver, while at the other end of the movement it connects cup 38 to the flange 106 so that they rotate in unison no matter which becomes the driver.

On the outside surface of low speed driven clutch cup 41 fine clutch teeth 109 are cut. Corresponding clutch teeth 111 are cut on an enlarged part 112 of main shaft 31. A sliding gear 113, having a grooved collar 114 integral, has internal clutch teeth partway only of its length corresponding to the teeth 109 and 111, and is slidable axially thereon to three positions, so that at the extreme forward end of its movement it is entirely on the cup 41 and in engagement only with the teeth 109 and therefore does not connect any two parts. At its middle position, shown in Fig. 1 it connects the cup 41 and the enlarged part 112 of shaft 31. At its extreme rearward position its toothed interior engages only the teeth 111 on the enlarged part 112 of the shaft 31. But in its extreme rearward position the sliding gear 113 is in mesh with a reversing idler gear 116. (See Figs. 7 and 8). Reversing idler gear 116 has integral therewith the idler gear 117 which is in constant mesh with the gear 48 (see Figs. 6 and 8). Integral idler gears 116 and 117 revolve about the stationary idler shaft 118 supported in hubs 119 in the transmission housing 29.

A shifting fork 121 engages the groove in the collar 108 and a similar shifting fork 122 engages the groove in the collar 114. Shifting fork 121 is attached to high and intermediate shifting bar 123 (see Fig. 6), while the reverse shifting fork 122 is attached to reverse shifting bar 126 (see Fig. 7). The "H" control lever 128 operates in the usual manner, that is, when the ball 129 is moved over into the notch 131 of bar 123 and the top end of the lever 128 is pushed forward, the bar 123 pulls the fork 121 rearward, and positive connection is established by collar 108 between the cup 38 and the flange 106 of intermediate gear 44, and, while the ball 129 remains in the notch 131, if the top of the lever 128 is pulled rearward, the bar 123 pushes the fork 121 forward, and positive connection is established by collar 108 between cup 38 and cup 49 of high speed pinion 42. Similarly when the ball 129 is moved over into a similar notch of the bar 126, (notch not shown) and the top end of the lever 128 is pushed forward, the bar 126 pushes the fork 122 rearward (see Fig. 7), and shifts the sliding gear 113 (see Fig. 1) to its most rearward position, where it connects the shaft 31 to the gear 48 through the reversing idlers 116 and 117. When the lever is shifted to its opposite extreme, the sliding gear 113 will be entirely on the cup 41 and in this position the shaft 31 is drivably disconnected from the transmission. In the central position of the "H" control lever 128, which is the position shown in the drawing, the cup 41 and the shaft 31 are drivably connected. Detents 134 are provided to maintain the shifting bars in their several positions as in common practice.

Inasmuch as the spring clutch sleeve 34 is rotatable on the rotatable shaft 31, it is advisable that it be lubricated interiorly from a reservoir 136 centrally located partly in the shaft 31 and partly in the shaft 23. But it is not a simple matter to keep a reservoir in the center of a rotating shaft filled.

To obviate this difficulty the two splash cups 137 (see Figs. 1 and 5) are cast integral with the transmission housing 29 near its cover 138. A narrow transferring reservoir 139 cored in the flywheel cover 22 surrounding the shaft 23 (see Figs. 1 and 12) is kept filled by two splash cups 137 through the holes 141. The reservoir 136 in the center of the shaft 31 and 23 is decreased in diameter at the ends as at 142 and 143. Cross holes 144 connect the transferring reservoir 139 to the main reservoir 136 through the hole 142. Other cross holes 146 at the opposite end connect the main reservoir 136 to the interior of the transmission housing through the holes 143. Other cross holes 147 extend outwardly from the central reservoir 136 to the rotatable parts to be lubricated. The countershaft 30 is non-rotatable and has the central reservoir 148 kept supplied through the holes 149. Cross holes 151 convey the oil to the parts to be lubricated. Oil escape grooves 152 and 153 surround shafts 23 and 31 at opposite ends of the transmission, and oil return holes 154 and 156 connect these grooves with the interior of the housing 29.

The operation of the transmission may best be described by assuming a definite R. P. M. range for the engine with definite vehicle M. P. H. for the given engine speeds, and selecting definite speeds at which the novel features of the transmission function.

Accordingly it will be assumed for illustrative purposes only, that the engine will idle down to three hundred R. P. M. and that it has a top speed of thirty-six hundred R. P. M.; that at its top speed it drives the vehicle at seventy-two M. P. H. when the transmission is in high gear, thirty-six M. P. H. in second gear, and eighteen M. P. H. when in low gear; that the construction of the clutch 28 is such that it engages and effectuates low gear at about four hundred engine R. P. M. or two M. P. H.; that when the vehicle is being driven in low gear anywhere between six and eighteen M. P. H., accelerator controlled change in ratio to second gear may be had; and that when the vehicle is being driven in second gear anywhere between ten and thirty-six M. P. H., accelerated control change in ratio to high gear may be had.

With these values so fixed the operation will be readily understood. Regardless of whether the clutch 28 is manually operable or is controlled by vacuum or centrifugal force, or other automatic means, it should not engage until the engine has been raised from its idling speed of three hundred R. P. M. to at least four hundred R. P. M.

When the engine is first started, the "H" control lever should be in the position which, in a standard transmission, represents low gear. In this position the sliding gear 113 will be wholly on the cup 41 and therefore entirely ineffective to transmit motion. The engine may then be raced to warm it up and even though the clutch 28 is automatic and engages when the engine passes four hundred R. P. M., there is no connection to the main shaft 31 and the vehicle is consequently not moved.

After the engine is warmed up, if free wheeling and accelerated controlled gear-ratio-changing is desired, the "H" control lever should be placed in the position which, in a standard transmission, is known as neutral. This is the central position in which the lever is shown in Fig. 1. In this position the main shaft 31 and the three driven clutch cups 41, 39 and 38 are all connected together and therefore revolve in unison. Which of the gear ratios will now be in effect will depend upon which of the driving cups 52, 51 or 49 is driving its driven cup.

Inasmuch as the spring 102 fits its cup snugly, the clutch 45 is always effective, that is, the cup 52 always drives the cup 41 except when the cup 41 runs ahead of the cup 52.

But inasmuch as the springs 53 and 60 are both smaller than their cups, neither of the spring clutches 35 or 25 are normally effective but are only effective when the operator elects to have them so, and he may not, by electing, make second gear clutch 35 effective when moving less than six M. P. H. nor may he, by electing, make high speed clutch 25 effective when moving less than ten M. P. H.

When the low speed clutch 45 is effective the main shaft 31 is driven through gears 42, 43, 48 and 47 at one-fourth engine speed. When by choice the operator makes the second speed clutch 35 effective, the main shaft 31 is driven through gears 42, 43, 46 and 44 at one-half engine speed and the clutch 45 overruns.

When by choice the operator makes the high speed clutch 25 effective, the main shaft 31 is driven directly, without gearing, at engine speed, and the clutches 45 and 35 both overrun, that is, when in high gear, the driven cup 41 of the low speed clutch is revolving at engine speed but its driver 52 is revolving only one-fourth engine speed, and driven cup 39 of the second speed clutch is revolving at engine speed but its driver 51 is revolving only one-half engine speed. The manner in which the second speed clutch 35 is made to become operative at the election of the operator is best illustrated in Figs. 9, 10 and 11.

When the "H" control lever is in the middle position shown in Fig. 1, and the main clutch 28 becomes engaged, and the engine begins driving the vehicle through the low speed clutch 45, then the relation of the parts in the second speed clutch 35 will be as shown in Fig. 9, that is; there is a slight space 55 between the outside diameter of the spring 53 and the inside diameter of the cups 51 and 39; there is a slight space 69 between the end of the spring 53 and the flange 57; there is a gap 68 between the inner ends of the hubs 63 and 56; and the series of balls 67 and 61 are both as near the axis of rotation as they can get. When these parts are in this relation neither of the cups 51 or 39 will drive the other in any direction of rotation.

Now as long as the engine continues to drive the vehicle through the low speed clutch 45 at less than four M. P. H. the second speed clutch 35 will remain as shown in Fig. 9. But it must be remembered that at this time the cup 51 is revolving twice as fast as the cup 39, consequently the balls 67 are revolving twice as fast as the balls 61. Inasmuch as centrifugal force increases as the square of the number of revolutions, it follows that as long as the balls 67 continue to revolve twice as fast as the balls 61, the force per unit of weight of balls 67 is four times as great as that of balls 61, and therefore the balls 67 will always move radially outward and close the gap 68 before the balls 61 move outwardly at all.

The weight of the balls 67, and the strength of the spring 70 are so proportioned that when the vehicle is being driven through the low speed clutch 45 and the speed is brought up to four M. P. H., the balls 67 move outwardly to the position shown in Fig. 10, close the gap 68, and lock the balls 61 against outward movement. After this takes place the clutch 35 is locked so as to be ineffective, whereupon the vehicle may be driven in low gear throughout the entire speed range of the engine because, in low gear, the balls 67 will always revolve twice as fast as the balls 61 no matter how fast the vehicle is being driven. The second speed clutch then appears as in Fig. 9 when the vehicle is driven at less than four M. P. H. in low and as in Fig. 10 when the vehicle is driven at over four M. P. H. in low. It will be observed that in Fig. 10 there is still space 55 around the spring 53 and space 69 at the end of the spring 53. Therefore the cups 51 and 39 are still ineffective to drive each other through the spring 53 in either direction of running.

It will also be apparent that if the cup 51 can be made to drive the cup 39 through the spring 53 then the power will be transmitted from the pinion 42 to gear 43 to gear 46 to gear 44 to cup 51 to cup 39, and inasmuch as the cup 39 is part of the clutch sleeve 34 the mechanism will then be in second gear and the low speed clutch 45 will overrun. To make the second speed clutch thus effective it is necessary to cause the relation of their parts to be shifted as in Fig. 11. Whenever they are thus shifted the transmission will be in second gear.

The weight of the balls 61 in relation to the strength of the spring 70 is so proportioned that when driving in low gear at six or more M. P. H. the balls 61 exert sufficient outward force to compress the spring. But balls 61 cannot move outwardly because balls 67 revolving at double the speed of balls 61 have acted ahead of them to close the gap 68. It is only by reducing the speed of balls 67 to approximately that of balls 61 that the parts of the second speed clutch may be shifted from Fig. 10 to Fig. 11 and second gear made effective. This may be accomplished when in low gear and moving anywhere between six and eighteen M. P. H. by releasing the accelerator pedal 97, thereby reducing the speed of the engine, which reduces the speed of the cup 51, while the cup 39 continues on momentum at the same speed as before. When the cups 51 and 39 revolve at approximately the same speed, the small balls 67 now, no longer having four times the power because of twice the speed, yield and move inward while the larger balls 61 move outward. Fig. 11 shows the second speed clutch 35 after it is thus made operative as an overrunning clutch.

It will be seen that the balls 67 have been forced radially inward when the balls 61 have moved outwardly from the axis of rotation, the flange 57 has moved axially, closing the space 69 and opening the new space 157, and by rubbing the end of the spring 53 in a rotary direction to cause it to become of larger diameter, the space 55 around the spring 53 has been closed. In this condition the clutch 35 is made effective as an overrunning clutch through which the cup 51 may drive the cup 39 but the cup 39 may still overrun the cup 51.

After clutch 35 has been allowed to assume the state shown in Fig. 11 it will remain in this state as long as the vehicle moves more than six M. P. H. In this state the clutch may overrun, either from momentum or when the high speed clutch 25 becomes effective. When it does overrun it is considered an advantage that the end of the spring 53 is rubbed in the rotary direction which makes the diameter of the spring smaller and reproduces the space 55 around it which minimizes wear. In Fig. 11 the spring 53 is shown enlarged as it is when the cup 51 is driving the cup 39.

Bar stock of rectangular cross section is used for spring 53 because with the length of the rectangle lengthwise of the spring sufficient friction will be had between the end of the spring and flange 57 without making the spring so much shorter, and the spring will unwind to a given increased diameter with less applied friction on the ends than when square stock of the same sectional area is used.

Clutch 35 is however maintained as an overrunning clutch only so long as this slight rotative friction is applied to the end of the spring 53.

If at any time the speed of the vehicle is dropped below six M. P. H., the small spring 70 overcomes the centrifugal force of the balls 61, which then move inwardly and relieve the end friction on the end of the spring 53 which thereupon instantly collapses to its smaller diameter shown in Fig. 9 even though at the time it is operating under full load. The transmission is then again in low gear without having been given any attention from the operator.

Now when the clutch 35 is once made operative as shown in Fig. 11, the vehicle may be driven in second gear through the entire speed range of the engine, except not under six M. P. H., that is, it may be driven in second gear at speeds from six to thirty-six M. P. H. But any time, after ten M. P. H., that the operator desires he may momentarily release the accelerator pedal 97 and the high speed clutch 25 will be made effective by changes, very like those just described in relation to the clutch 35.

The high speed clutch 25 is shown to an enlarged scale in Fig. 2. When the vehicle is in second gear and moving about seven M. P. H. the small balls 83 move outwardly and close the gap 85. At ten M. P. H. the large balls 77 have force enough to overcome the small spring 84 but cannot move out because the gap 85 is closed. At any speed over ten M. P. H. the operator may release the accelerator pedal 97 and slow down the speed of the cup 49 while the cup 38 runs on momentum until both cups run approximately the same speed, whereupon the balls 77 will move out, close the space 86, apply rotative friction to the end of spring 60, enlarge it to close the space 71 and make it effective as an overrunning clutch where the cup 49 will drive the cup 38 but the cup 38 may still overrun the cup 49.

Now just as the second speed clutch 35 may be made operative at any speed from six to thirty-six M. P. H., so the high speed clutch 25 may be made operative at any speed from ten to seventy-two M. P. H., but while the second speed clutch 35 automatically changes from second gear back to low gear at six M. P. H. the speed at which the high speed clutch 25 may shift back to second gear is variable and within the control of the operator.

If the operator has reached, for instance, twenty-five M. P. H. with the transmission in second gear, and he decides he will shift to high gear, he releases his accelerator pedal, and when he depresses it again the transmission will be in high gear. But if he now decides that he has shifted into high gear too soon, and wishes instead to raise the speed of the vehicle to thirty-six M. P. H. before shifting into high gear, he merely fully depresses the accelerator pedal 97 whereupon the collar 92 forces the rods 91 against the washer 88 thereby compressing the spring 84 which forces the balls 77 radially inward, reproduces the space 86, removes the rotative friction on the end of the spring 60 whereupon it gets smaller and produces the space 71. When all this takes place the transmission is put back in second gear even though the vehicle is already moving twenty-five M. P. H.

The proportion between the weight of the balls 77, the strength of the spring 84, and the axial movement of the collar 92 which strengthens the spring 84, makes it possible by mere manipulation of the accelerator pedal to move a vehicle from zero to eighteen M. P. H. in low gear, but he may release the pedal after six M. P. H. and he will be in second gear. He may then vary the speed from six to thirty-six M. P. H. in second gear, but to get back to low gear he must decrease the speed to less than six M. P. H.

After he reaches ten M. P. H. in second gear he may shift to high gear by releasing his accelerator pedal. By very gradually depressing the accelerator pedal he may build up speed in high gear from ten to seventy-two M. P. H., but if he wishes to build up speed more rapidly he depresses the pedal 97 and strengthens the spring 84 whereupon the transmission returns to second gear and stays there until he again releases the pedal.

The principle difference between the second speed clutch 35 and the high speed clutch 25 is that when the second speed clutch 35 once engages and changes from low gear to second gear, it is necessary to reduce the vehicle speed to six M. P. H. before the transmission will automatically return to low gear, while if the high speed clutch is made effective by the release of the accelerator pedal to change the transmission from second to high gear, the vehicle speed at which the transmission may be put back into second gear is within the control of the operator through the pedal 97, the collar 92, the rods 91 and the washer 88. Of course it will readily be seen that, should it be desirable to vary the speed at which the transmission will shift from second gear back to low gear, this could be done by providing manual means, similar to that provided for the high speed clutch by parts 92, 91 and 88, whereby the small spring 70 of the second speed clutch 35 could be varied in the same manner.

If, because the pavement is wet or icy, or because of extended down hill driving, the operator chooses not to have free-wheeling or automatic speed ratio shifting, he need only to operate the "H" control lever 128 to the positions corresponding to those provided in a standard transmission for high and second speed gear, and when he has shifted to the "high" position he will have positively connected cup 49 to cup 38 by the collar 108 whereby the engine is joined directly to the main shaft 31 without gearing and without freewheeling, and when in the second speed position he will have positively connected cup 38 to the flange 106 with the same collar 108, whereby he connects the main shaft 31 directly to the gear 44 through the sleeve 34, whereby it is driven at half engine speed but without free-wheeling.

To reverse the vehicle, the operator merely pushes his "H" control lever to a position corresponding to that provided for reversing in a standard transmission. By doing so he shifts the sliding gear 113 rearward, to the rear end of the enlarged part 112 of the shaft 31 where its teeth engage those of the idler gear 116, Figs. 7 and 8.

When using the "H" control lever to shift into conventional second gear it is preferable that the operator, by means of his accelerator, should shift into free-wheeling second gear, for then he would slide his gear shift lever into positive connection with absolutely no clashing, because the two parts which he must connect are revolving in unison. The same is true of shifting into conventional high gear.

The gear 42 revolves whenever the clutch 28 is in engagement, and oil is thereby splashed into the cups 137, from which it flows through the holes 141 into the reservoir 139, so that the reservoir 139 is always filled.

Whenever the clutch 28 disengages and the shaft 23 ceases to rotate, the oil flows by gravity through holes 144 and 142 into central reservoir 136, the air in the shaft passing out through holes 143 and 146 at the other end. When the shafts 23 and 31 again rotate, of course there will be a pumping action due to the revolving cross holes 144 and 146 to pump the oil from the reservoir 136 back into the reservoir 139. But this pumping action is not effective to remove from the reservoir 136 a thin layer of oil which centrifugal force holds around its outer surface while it revolves. Some of the oil that flows into reservoir 136 will each time be pumped back but enough will remain to supply the outlet holes 147 each time the shaft 23 starts and stops.

One of the chief advantages of driving a vehicle having the transmission mechanism herein described is that the operator need never remove his one foot from the accelerator pedal, thus leaving his other foot always on the brake pedal. He need rarely remove either hand from the steering wheel. After starting his engine and racing it for several seconds he may drop it to the idling speed and then set his gear shift lever in the center. If the need for reaching the maximum vehicle speed is now extremely urgent he may, as rapidly as possible, bring his vehicle up to eighteen M. P. H. in low gear, release his accelerator for one second while the vehicle free-wheels, depress the accelerator and bring the vehicle up to thirty-six M. P. H. in second gear, again release his accelerator for one second, while the vehicle free-wheels, then depress it until the vehicle reaches its maximum speed of seventy-two M. P. H. in high gear. On the other hand if he is in no hurry he may accelerate to six M. P. H. in low gear, change to intermediate, accelerate to ten M. P. H. in second gear, then change to high gear.

Again he may wish to retain low gear throughout continued uphill driving. This he may do and drive anywhere between two and eighteen M. P. H. Or, he may desire to indefinitely retain second gear ratio, which he may do and drive anywhere from six to thirty-six M. P. H. All of these options the operator may choose from, and all without shifting a lever, pressing a button, or removing his foot entirely from the accelerator pedal.

When the vehicle is being driven in high gear against a heavy load, the speed at which the transmission will come back into second gear depends upon how heavy the load is, for, if the load in high gear is so heavy that the accelerator is fully depressed to carry it, and this load still pulls the vehicle down to thirty-six M. P. H., the transmission will automatically shift back to second gear at thirty-six M. P. H. On the other hand if the load being carried in high gear is only so heavy as to require slight depression of the accelerator pedal to maintain it, then the transmission may not automatically shift back to second gear until the vehicle speed is reduce to ten M. P. H.

It will of course be understood that the M. P. H. at which speed ratio-shifting takes place has herein been selected arbitrarily, and that it may be changed to correspond to each individual application. Likewise the gear ratios of one to one, two to one and four to one used for high, second and low are only approximately those commonly used, the even ratios being herein used to facilitate description.

My co-pending application Serial Number 555,186, filed August 5th, 1931, discloses a transmission which is similar in many of its parts to the present invention, the most marked improvement in the present invention being the means whereby the small spring 84 of the high speed clutch 25 is varied in strength by the movement of the accelerator pedal 97.

Having described my invention,

I claim—

1. Automotive vehicle mechanism comprising, in combination, an engine, a driving member rotatable in unison with said engine, a rotatable driven member, gearing operated by said driving member to rotate said driven member at a lesser speed than said driving member, means whereby said driven member may overrun and exceed the speed at which it is being driven by said gearing, a clutch operable into engagement to connect said driving to said driven member directly independently of said gearing, a speed responsive means for engaging said clutch, a variable means for opposing said engaging means and a common means for controlling both the said variable means and the fuel being supplied to said engine.

2. The structure defined in claim 1 in which the said common means is a pedal arranged to simultaneously vary both the said variable means and the rotative speed of said engine.

3. In combination, an automotive engine, a transmission housing, a driving member extending from said engine into said housing, an accelerator pedal for said engine outside of said housing, a driven member within said housing, speed reducing gearing within said housing for rotating the said driven member at a lesser speed than said driving member, speed responsive means for connecting said driving and driven members directly independently of said gearing, and a mechanical connection extending from said accelerator pedal axially through said driving member into said housing to said speed responsive connecting means, operative by said pedal to oppose and disconnect said direct connecting means.

4. The structure defined in claim 3 in which a resilient means opposes engagement of the said direct connecting means and the said mechanical connection is operative to increase the tension of the said resilient means.

5. The combination, in automotive transmission mechanism, of a cylindrical driving member, a cylindrical driven member, speed reducing means connecting said driving and said driven members, a coil spring fitting said cylindrical driving and driven members loosely, speed responsive means for engaging and applying rotative friction to the said spring to coil it to a different diameter so as to cause it to fit the cylindrical members tightly, and manual means to urge said speed responsive means out of engagement with said spring whereby said spring is caused to fit the said cylindrical members loosely.

6. The structure defined in claim 5 wherein the said cylindrical members are cup shaped and the said spring fits the inner diameter of the said cups.

7. A unit of an automotive transmission comprising an engine, a driving element rotatable by said engine, a driven element, speed reducing gearing connecting the driving and driven elements, automatic means for connecting the driving and driven elements directly, a second automatic means for holding the first said automatic means inoperative as long as the driven member is revolved at a reduced speed through said gearing but which permits the first automatic means to become operative when said driving member is brought down to the speed of the driven member, and manual means to assist the second automatic means to render the first automatic means inoperative whenever the second automatic means has permitted it to become operative.

8. The structure defined in claim 7 wherein the automatic connecting means comprises a centrifugal governor.

9. The structure defined in claim 7 wherein the automatic restraining means is a centrifugal governor.

10. The structure defined in claim 7 wherein the means to render the automatic connecting means inoperative after the automatic restraining means has permitted it to become operative, is a mechanical connection to an accelerator pedal provided for changing the speed of said engine.

11. Automotive vehicle mechanism comprising an engine, a driving member rotatable by said engine, a driven member, reduction gearing connecting the two said members for revolving the driven member at a reduced speed, means to connect said driving and driven members directly to revolve them in unison, a member automatically movable axially to operate said direct connecting means into engagement, a second member automatically movable axially and oppositely of the first axially movable member to hold the first said axially movable member against axial movement until the speed of the said driving member is reduced to the speed of the said driven member, a spring between the two said axially movable members urging them axially in opposite directions, and manual means operable to depress the one end of said spring to remove its tension from the second said axially movable member and thereby increase its tension on the first said axially movable member.

12. The structure defined in claim 11 in which the manual means is operable to simultaneously depress the said spring and to open the fuel valve of the said engine.

13. Automotive vehicle mechanism comprising, in combination, an engine, three driving members simultaneously revolved by said engine at high, second and low speeds, three driven members connected together for rotation in unison, one adjacent to each of the said driving members, an overrunning clutch for each of the three driven members operable to overrunningly connect said driven members to said driving members, the low speed clutch being overrunningly connected at all vehicle speeds, automatic means for overrunningly connecting the second speed driving and driven members, a second automatic means for overrunningly connecting the high speed driving and driven members, said first automatic means being operative to disconnect said second speed clutch at a fixed vehicle speed, and manually controllable means to vary the speed at which said second or high speed clutch engages and the speed at which said high speed clutch disengages.

14. The structure defined in claim 13 having a common means for simultaneously raising the speed of the said driving members and the speed at which the high speed overrunning clutch will disengage.

15. The structure defined in claim 13 wherein there is an accelerator pedal for said engine and mechanical means operable by said pedal for raising the speed at which said high speed clutch will automatically disengage.

16. The structure defined in claim 13 wherein there is an accelerator pedal for said engine, and means whereby release of said pedal at a determined speed engages the said second speed clutch, release at a higher determined speed engages said high speed clutch, and depression of said pedal raises the speed at which said high speed clutch will disengage.

17. Automotive vehicle mechanism comprising an engine, a rotatable driving member revolved by said engine, a rotatable driven member, speed reducing means connecting said driving to said driven member, means whereby said driven member may overrun and exceed the speed at which it is being driven through said speed reducing means, means operable into engagement to connect said driving and driven members directly independently of said speed reducing means, centrifugal means for engaging said direct connecting means, means opposing said centrifugal means for disengaging said direct connecting means, and a common means for simultaneously increasing the force of said opposing means and the engine fuel.

18. The combination in an automotive transmission mechanism of a rotatable driving element, a rotatable driven element, speed reducing gearing connecting the driving and driven elements, automatic means for connecting the driving and driven elements directly, a second automatic means for overcoming the first automatic means, manual means for assisting the second automatic means in overcoming the first automatic means, and overrunning means in the gearing operative whenever the combined effort of the second automatic means and the manual means does not overcome the first automatic means.

19. The combination in an automatic vehicle, of an engine, a driving member rotated by said engine, a rotatable driven member, speed reducing gearing connecting the driving and driven members, a clutch means for connecting the driving and driven members directly, a centrifugal means for engaging said clutch means, a second centrifugal means for overcoming the first, manual means for assisting the second centrifugal means in overcoming the first and simultaneously feeding more fuel to the engine, and overrunning means in the gearing operative whenever the first centrifugal means is not overcome by the said second centrifugal means and the manual means or either of them.

20. The structure defined in claim 19 wherein the manual means comprises a mechanical connection extending from the accelerator pedal to the interior of the said clutch.

FREDERICK W. COTTERMAN.